Sept. 15, 1959 R. P. LEWIS 2,903,973
AXLE ACTUATED GENERATOR DRIVE
Filed March 31, 1955 4 Sheets-Sheet 3
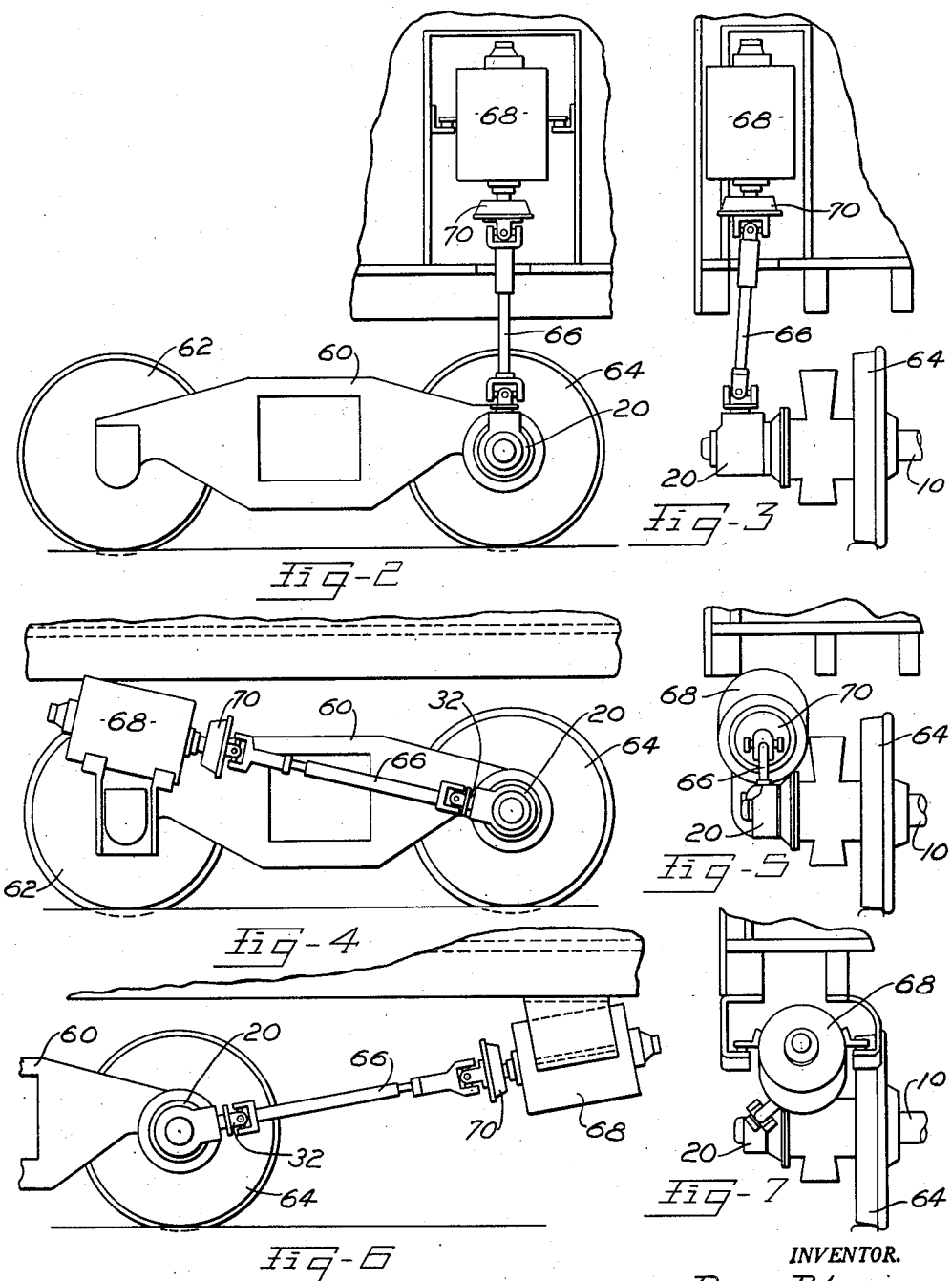
INVENTOR.
ROBERT P. LEWIS
BY Lawrence C. Witker
Atty.

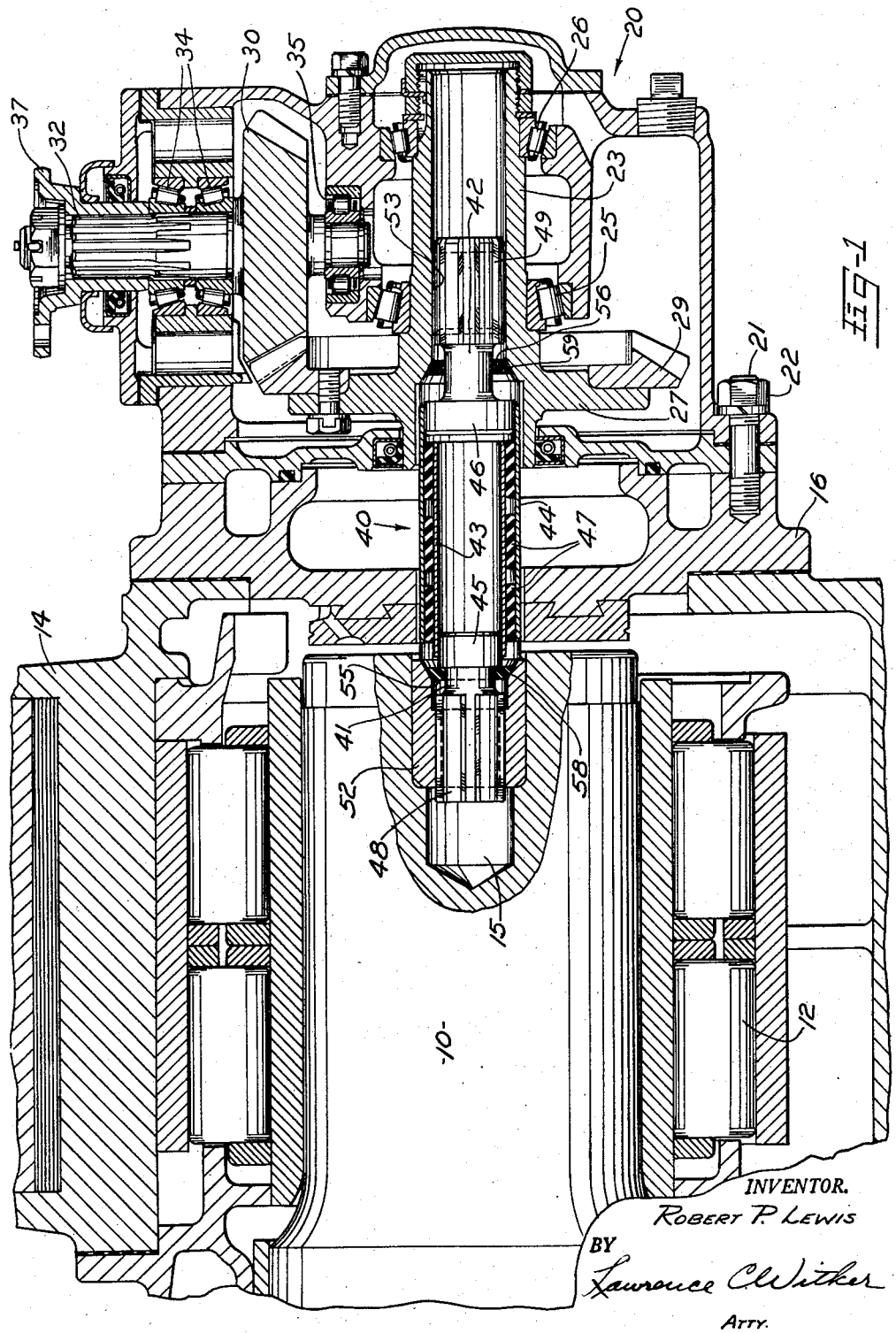

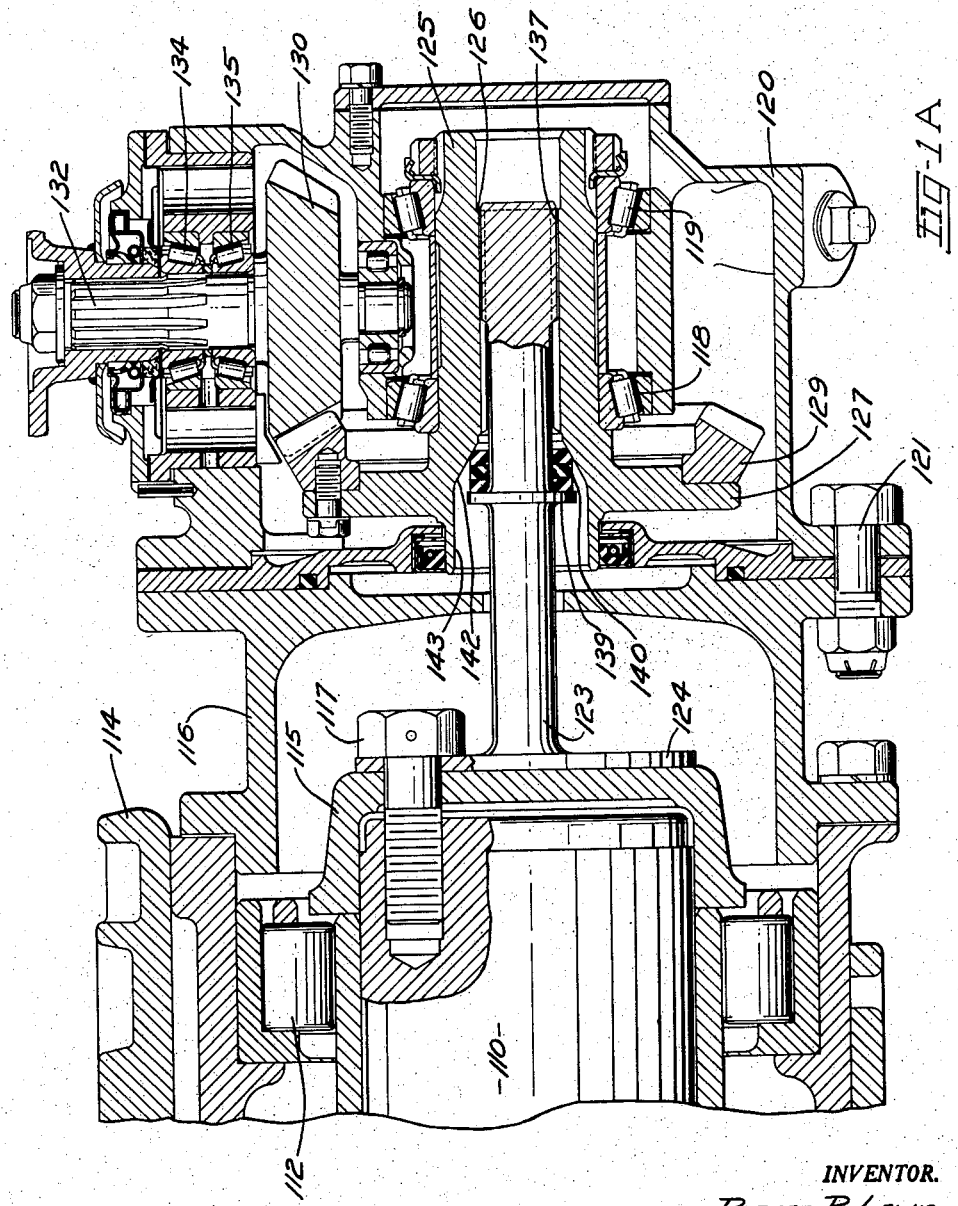

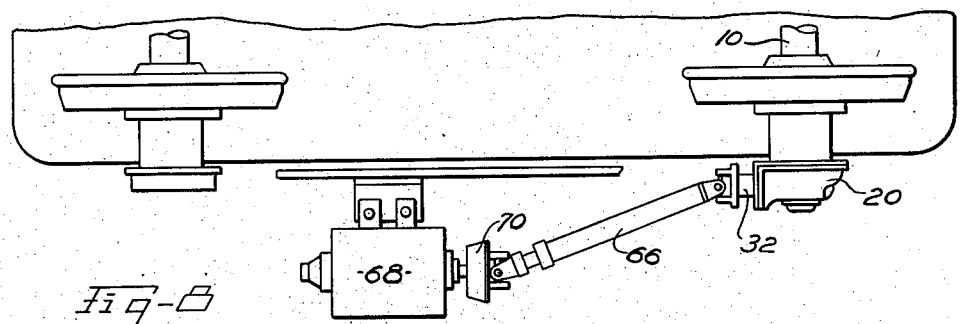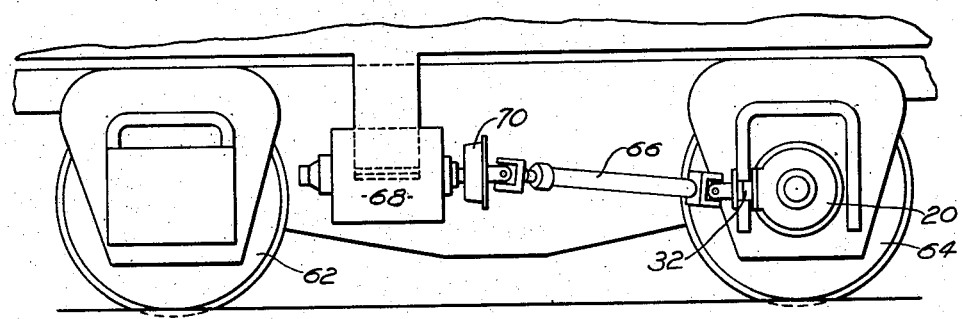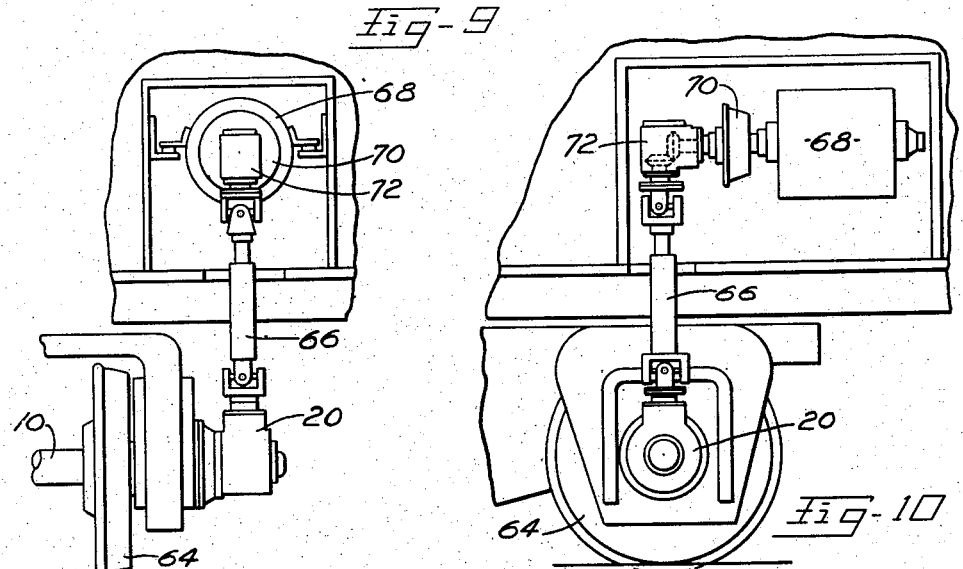

United States Patent Office 2,903,973
Patented Sept. 15, 1959

2,903,973

AXLE ACTUATED GENERATOR DRIVE

Robert P. Lewis, Toledo, Ohio, assignor to Dana Corporation, Toledo, Ohio, a corporation of Virginia Application March 31, 1955, Serial No. 498,356

5 Claims. (Cl. 105—96.1)

This invention relates to railway axle end driven power transmission apparatus and is particularly directed to positive means for transmitting the driving power from an axle to an associated generator.

An object of the invention is the provision of a simple and highly efficient positive generator drive of this character which consists generally of mechanism associated with a railway car axle journal box including a gear box or casing enclosing angle drive gearing arranged to furnish a power take-off from the end of axle and including a flexible driving connection between the axle and the gearing, the power take-off being arranged to drive the generator, through a drive shaft, irrespective of the position of the generator with respect to the end of the axle.

Further objects and advantages will become apparent from a study of the following description when considered in connection with the accompanying drawings, in which:

Figure 1 is sectional detail view of a drive embodying the invention applied to the end of a railway car axle;

Figure 1A is a sectional detail view illustrating another form of the drive.

Figures 2 and 3 are side and end elevations of a generator and drive installation in which a vertically disposed generator is located generally vertically above the axle and;

Figures 4 and 5 are side and end elevations of a generator and drive installation in which the generator is mounted angularly adjacent one axle of railway car truck and the drive is associated with the end of the other axle;

Figures 6 and 7 are side and end elevations of a generator and drive installation in which the generator is hung from the bottom of the railway car and the drive is associated with the end of an adjacent axle;

Figures 8 and 9 are top and side views of a generator and drive installation in which the generator has an outboard mounting intermediate the axles of a railway car truck and the drive is associated with the end of an adjacent axle interconnected by an angularly disposed drive shaft;

Figures 10 and 11 are side and end elevations of a generator and drive installation in which the generator is disposed horizontally above the axle end, a right angle drive gear box being arranged between the generator and a generally vertical drive shaft from the axle drive mechanism.

Referring to Figure 1 of the drawing, a railway car axle shaft 10 has been illustrated as journalled in antifriction bearings such as roller bearings 12 in a journal box 14 of conventional construction. To accommodate the drive of the present invention the end of axle 10 is provided with an axial bore 15 for a purpose hereinafter appearing. A gear box adapter plate 16 replaces the usual journal box cover.

Gear box 20 is located on the adapter 16 by equally spaced studs 21 and secured by nuts 22. The drive mechanism within casing 20 consists primarily of a generally horizontally disposed hollow shaft 23 axially aligned with the bore 15 in axle shaft 10. Shaft 23 suitably journalled in bearings 25 and 26, is provided with a radial flange 27 to which is secured a ring gear 29. Gear 29 meshes with a pinion gear 30 formed on the end of a take-off or pinion shaft 32 journalled at right angles to shaft 23 in suitable bearings 34 and 35. The outer end of shaft 32 receives a flanged section 37 of a universal joint to which may be coupled a drive shaft of suitable type. Shaft 32 here shown as extending vertically, may readily be disposed at various angles between horizontal and vertical to suit various generator installation as later described.

To transmit rotation from the axle shaft 10 to the hollow shaft 23 and compensate for misalignment and endwise movement of the shaft 10 a coupling, indicated generally at 40 is used. The coupling comprises opposite axially spaced end members or stub shafts 41, 42 for connection to the two rotating parts to be coupled together, radially spaced telescoping elements 43, 44 between the end members secured at their opposite ends only to the end members 41 and 42 respectively, and compressible resilient motion transmitting spacers 47 between the elements in binding engagement therewith.

The end members 41 and 42 are shown as having cylindrical heads 45, 46 of different diameters. The telescoping elements 43, 44 are shown as sleeves attached respectively to the heads 45, 46 but the sleeve 43 attached to the head 45, is unattached to the head 46, and the sleeve 44, attached to the head 46, is unattached to the head 45, so that the two sleeves have a slight vibratory movement in a rotary direction. The spacing means, compressed between the sleeves, provides a motion transmitting connection between the sleeves which permits the sleeves to have a movement to compensate for misalignments, and also to absorb vibration. The spacing means are of a rubber or rubber-like material and may be held in binding relation to both sleeves by the compression thereof, or may be bound to either or both of the sleeves by a binder. The sleeve 43 fits the head 45, and the sleeve 44 fits the head 46. The spacing means is here shown as consisting of a plurality of rings 47 axially spaced lengthwise of the sleeves between the same.

Each of the end members 41, 42 is shown as formed with externally splined base portions 48, 49 respectively, for interfitting with splines formed in the parts to be coupled together. That is, in an axial bore 15 in the end of the axle 10, or in a collar 52 fitted into said bore, and on splined end 53 of the shaft 23 mounted in the box 20 to transmit motion through gears 29 and 30 and shaft 32 to the propeller shaft, connected to the electric generator to be actuated by the axle 10. Oil seals or washers 55, 56 of resilient material are located between the members 41, 42 and the walls of the bores in which the end members 41, 42 are located, these washers having conical faces 58 and 59 respectively for coacting with complemental faces in the bores in which they are located. The coupling is particularly advantageous in that it is flexible and corrects misalinements, absorbs vibrations, and is noiseless. Further, the splined connections between the coupling 40 and axle 10 and hollow shaft 23, respectively, compensate for end-wise movement of the axle 10.

Referring now to Figures 2 and 3, a railway car truck is diagrammatically shown at 60 having wheels 62 and 64 mounted on the usual axles, one of which is shown at 10. The structure gear box 20 of Figure 1 has been incorporated with the end of the axle and arranged to drive a propeller or drive shaft 66 extending generally vertically upward from the gear box to a vertically disposed electric generator 68. A clutch mechanism 70 is interposed between the shaft 66 and the generator 68 which may be of any suitable type capable of coupling and uncoupling the drive to the generator.

In the arrangement shown in Figures 4 and 5, the car truck 60 is provided with supporting means of suitable type on which the generator 68 is mounted adjacent the axle for wheel 62. The gear box 20 is associated with the end of the other axle 10. Beacuse of the location of the generator 68, it will be noted that the propeller shaft 66 extends angularly between the clutch 70 and the gear box 20. To so mount the gear box 20 it is only necessary to attach the same to the axle housing with the shaft 32 extending at the desired angle. This is accomplished by rotating the box 20 to align the holes for studs 21 with the desired studs, and securing the box 20 to the adapter 16 in such position.

In Figures 6 and 7, the drive shaft is also angularly disposed, but in this arrangement the generator 68 is mounted on suitable brackets hung from the car frame at a suitable location with respect to one end of the car truck. The shaft 32 extends in the opposite direction to that shown in Figure 4, which further illustrates the universal mounting arrangement provided in the mechanism of this invention.

In the event it may not be desirable to mount the generator in the above locations, an outboard mounting is shown in Figures 8 and 9. In this arrangement a bracket is provided which may be suitably attached to the car so that the generator 68 is located outwardly thereof in which case the propeller shaft 66 is extended diagonally inwardly and downwardly toward the axle 10 from which the generator 68 is driven. In this arrangement, it will be noted that the shaft 32 is nearly horizontally disposed. Thus, it will be clear that it is intended to drive the propeller shaft 66 from the gear box 20 at any convenient angle from horizontal to vertical in either direction from the car axle center line.

When horizontal placement of the generator is more convenient than vertical as in Figures 2 and 3, the generator 68 may be driven as shown in Figures 10 and 11. Here it will be noted that a right angle drive gear box 72 is arranged between the propeller shaft 66 and the clutch 70. Thus, the drive from gear box 20 is in a vertical direction to the box 72 and in a horizontal direction to the generator through clutch 70.

In the form of the invention shown in Fig. 1A the railway car axle shaft 110 is journalled in antifriction bearings 112 in journal box 114. A cup shaped bearing retainer 115 is normally secured to the end of axle 110 by a plurality of bolts 117. Rotation of the axle 110 is imparted to the gearing in Fig. 1A means of flanged shaft 123, the flange 124 of which is apertured to receive the shanks of bolts 117. Bolts 117 thus serve to retain shaft 123 in axial alignment with axle 110 and provide a rigid driving connection between the axle and shaft. A gear box adapter 116 replaces the usual journal box cover and serves to space gear box 120 the desired distance from the end of the axle 110.

Gear box 120 is located on the adapter 116 by spaced bolt and nut assemblies 121. Within casing 120 is a generally horizontal hollow shaft 125 internally splined at 126 and provided with a radial flange 127 to which is secured a ring gear 129. Hollow shaft 125 is suitably journalled in bearings 118 and 119. Gear 129 meshes with a pinion gear 130 formed on the end of a take-off or pinion shaft 132 journalled at right angles to shaft 125 in bearings 134 and 135.

Hollow shaft 125 receives the outer splined end 137 of shaft 123, the cooperating splines 126 and 137 compensating for end-wise movement of axle 110 while driving the gearing 129, 130. An intermediate flange 139 is provided on shaft 123 and serves as an abutment for sound and shock absorbing washers 140 surrounding the shaft 123 and interposed between the flange 139 and a tapered neck portion 142 of an enlarged bore 143 in the inner end of shaft 125.

This form of the invention is as equally well adapted for installation in the arrangements shown in Figures 2 to 11, as the form shown in Figure 1, as gear box 120 is capable of being selectively mounted on adapter 116 in a number of different positions at the end of the axle.

What I claim is:

1. In a device of the character disclosed, a rotary axle, a casing supported beyond the end of said axle, an internally splined shaft journalled in said casing, gearing in said casing including a gear mounted on said shaft, coupling means between said axle and said shaft comprising a driving shaft connected at one end to said axle, said driving shaft extending into the center of said splined shaft and having a splined connection therewith, and annular shock absorbing means between said axle and said splined shaft.

2. In a device for transmitting drive from the end of an axle to a gear box, the combination with a journal box having an axle terminating therein and journalled in antifriction bearings, of a tubular driven shaft in substantial axial alignment with the axle, an adapter mounted on the journal box, a casing supported by said adapter beyond the end of said axle, gearing in said casing including a gear mounted on said shaft, flexible coupling means between said axle and said shaft comprising a pair of axially spaced end members rotatably connected to and slideable axially of said axle and said shaft respectively, radially spaced concentric telescoping elements each connected at an opposite end to one of said end members, and compressible motion transmitting spacers between said concentric elements.

3. In a device for transmitting drive from the end of an axle to a gear box, the combination with a journal box having an axle terminating therein and journalled in antifriction bearings, of a tubular driven shaft in substantial axial alignment with the axle, a power take-off shaft at right angles to said driven shaft, an adapter mounted on the journal box, a casing supported by said adapter beyond the end of said axle in which said shafts are journally mounted, means to secure said casing to said adapter in selective relative positions to vary the angularity of said power take-off shaft, gearing in said casing including intermeshing gears mounted on said shafts, flexible coupling means between said axle and said tubular shaft comprising a pair of axially spaced end members rotatably connected to and slideable axially of said axle and said shaft respectively, radially spaced concentric telescoping elements each connected at an opposite end to one of said end members, and compressible motion transmitting spacers between said concentric elements.

4. In a device of the character disclosed, a rotary axle, a tubular driven shaft in substantial axial alignment with said axle, a casing supported beyond the end of said axle, gearing in said casing including a gear mounted on said shaft, flexible coupling means between said axle and said shaft comprising axially spaced end members rotatably connected to and slideable axially of said axle and said shaft respectively, radially spaced concentric telescoping elements each connected at an opposite end to one of said end members, and compressible, resilient motion transmitting spacers between said concentric elements in binding engagement therewith for transmitting drive from said axle to said gearing.

5. In a device of the character disclosed, a rotary axle, a tubular driven shaft in substantial axial alignment with said axle, a power take-off shaft at right angles to said driven shaft, a casing supported beyond the end of said axle for supporting said shafts, gearing in said casing including intermeshing gears mounted on said shafts, flexible coupling means between said axle and said tubular shaft comprising axially spaced end members rotatably connected to and slideable axially of said axle and said shaft respectively, radially spaced concentric telescoping elements each connected at an opposite end to one of said end members, and compressible motion transmitting spacers between said concentric elements for transmitting drive from said axle to said power take-off shaft.

References Cited in the file of this patent
UNITED STATES PATENTS 1,278,531    Wallbillich _____ Sept. 10, 1918